US009702699B2

United States Patent
Furuhata

(10) Patent No.: US 9,702,699 B2
(45) Date of Patent: Jul. 11, 2017

(54) FUNCTIONAL ELEMENT WITH A MASS BODY DISPLACED IN A DIRECTION WHICH INTERSECTS ITS MAIN SURFACE, ELECTRONIC APPARATUS AND MOBILE OBJECT

(71) Applicant: Seiko Epson Corporation, Tokyo (JP)

(72) Inventor: Makoto Furuhata, Matsumoto (JP)

(73) Assignee: Seiko Epson Corporation (JP)

( * ) Notice: Subject to any disclaimer, the term of this patent is extended or adjusted under 35 U.S.C. 154(b) by 65 days.

(21) Appl. No.: 14/733,321

(22) Filed: Jun. 8, 2015

(65) Prior Publication Data

US 2015/0362317 A1    Dec. 17, 2015

(30) Foreign Application Priority Data

Jun. 12, 2014  (JP) ................. 2014-121216

(51) Int. Cl.
G01C 19/00        (2013.01)
G01C 19/5747      (2012.01)
G01C 19/5733      (2012.01)
G01C 19/5769      (2012.01)

(52) U.S. Cl.
CPC ..... G01C 19/5747 (2013.01); G01C 19/5733 (2013.01); G01C 19/5769 (2013.01); Y10T 29/49119 (2015.01)

(58) Field of Classification Search
CPC  G01C 19/5747; G01C 19/5769; G01C 19/00; G01C 19/5733; G01C 19/574; G01C 19/5755; G01C 19/5762; Y10T 29/49119
See application file for complete search history.

(56) References Cited

U.S. PATENT DOCUMENTS

| 5,392,650 A | * | 2/1995 | O'Brien | ............. | G01C 19/5719 |
| | | | | | 73/514.18 |
| 5,992,233 A | | 11/1999 | Clark | | |
| 6,067,858 A | * | 5/2000 | Clark | ................. | G01C 19/5719 |
| | | | | | 73/504.16 |

(Continued)

FOREIGN PATENT DOCUMENTS

| JP | 2002-151703 A | 5/2002 |
| JP | 2002-515976 A | 5/2002 |

(Continued)

Primary Examiner — Harshad R Patel
Assistant Examiner — Samir M Shah
(74) Attorney, Agent, or Firm — Harness, Dickey & Pierce, P.L.C.

(57) ABSTRACT

A functional element includes a first base body; a coupling section which is coupled to the first base body; a support body which extends from the coupling section; a mass body which is coupled to the support body; a drive electrode which is provided on a surface side that faces the mass body; a detection working electrode which extends from the support body; and a detection fixed electrode which is coupled to the first base body and faces at least a portion of the detection working electrode. The mass body can be displaced in a direction which intersects a main surface of the mass body. When a distance between the first base body and the mass body is referred to as d1 and a distance between the first base body and the detection fixed electrode is referred to as d2, a relation of d1>d2 is satisfied.

18 Claims, 9 Drawing Sheets

(56) References Cited

U.S. PATENT DOCUMENTS

| | | | | |
|---|---|---|---|---|
| 6,386,033 B1* | 5/2002 | Negoro | G01C 19/5719 | 73/504.12 |
| 6,497,148 B1* | 12/2002 | Abe | G01C 19/5607 | 310/370 |
| 6,568,267 B2* | 5/2003 | Chida | G01C 19/5719 | 73/504.12 |
| 6,691,571 B2* | 2/2004 | Willig | G01C 19/5747 | 73/504.12 |
| 6,752,017 B2* | 6/2004 | Willig | G01C 19/5747 | 73/504.04 |
| 6,796,178 B2* | 9/2004 | Jeong | G01C 19/5712 | 73/504.02 |
| 6,877,374 B2* | 4/2005 | Geen | G01C 19/5719 | 73/504.14 |
| 6,925,877 B2* | 8/2005 | Geen | G01C 19/5719 | 361/280 |
| 7,043,987 B2* | 5/2006 | Jeong | G01C 19/5642 | 73/504.12 |
| 7,231,824 B2* | 6/2007 | French | G01C 19/5719 | 73/504.12 |
| 7,267,005 B1* | 9/2007 | Kranz | G01C 19/5719 | 73/504.12 |
| 7,308,827 B2* | 12/2007 | Holt | G01C 19/5719 | 73/504.02 |
| 7,313,958 B2* | 1/2008 | Willig | G01C 19/5747 | 73/504.12 |
| 7,316,161 B2* | 1/2008 | Willig | G01C 19/5747 | 73/504.12 |
| 7,882,740 B2 | 2/2011 | Okada | | |
| 8,061,201 B2* | 11/2011 | Ayazi | G01C 19/5719 | 73/504.12 |
| 8,601,873 B2* | 12/2013 | Sakai | G01C 19/5747 | 73/504.12 |
| 2001/0013253 A1* | 8/2001 | Hashimoto | G01C 19/5719 | 73/504.12 |
| 2003/0110858 A1* | 6/2003 | Kim | G01C 19/5762 | 73/504.02 |
| 2003/0131664 A1* | 7/2003 | Mochida | G01C 19/5719 | 73/504.12 |
| 2004/0226369 A1* | 11/2004 | Kang | B81B 3/0059 | 73/504.02 |
| 2006/0010978 A1* | 1/2006 | Lee | G01C 19/5747 | 73/504.02 |
| 2006/0101909 A1* | 5/2006 | Lo | G01C 19/5712 | 73/497 |

FOREIGN PATENT DOCUMENTS

| | | |
|---|---|---|
| JP | 2008-190931 A | 8/2008 |
| JP | 2011-245587 A | 12/2011 |

* cited by examiner

FUNCTIONAL ELEMENT WITH A MASS BODY DISPLACED IN A DIRECTION WHICH INTERSECTS ITS MAIN SURFACE, ELECTRONIC APPARATUS AND MOBILE OBJECT

BACKGROUND

1. Technical Field

The present invention relates to a functional element, a method of manufacturing a functional element, an electronic apparatus including a functional element, and a mobile object.

2. Related Art

In recent years, an angular velocity sensor (Gyro sensor) which is used as a functional element that detects angular velocity using, for example, a silicon micro electro mechanical system (MEMS) has been developed, and is used for a body control of a vehicle, a vehicle position detection of a car navigation system, vibration control correction (so-called, hand shake correction) of a digital camera, a video camera, and a mobile phone, or the like.

In U.S. Pat. No. 6,067,858, an angular velocity sensor is disclosed in which when a mass body is driven by vibration, a so-called vertical vibration in a direction that intersects a main surface of the mass body, and in a planar view, angular velocity of axis rotation in a direction along the main surface of the mass body is applied, the mass body is vibrated in another direction along the main surface by Coriolis force, and angular velocity of an internal surface axis rotation is detected by a change of a capacitance which is generated between a working electrode which extends from the mass body, and a fixed electrode which is disposed on a support substrate.

However, in the angular velocity sensor described in U.S. Pat. No. 6,067,858, if a mass body is driven by a vertical vibration, an interval between a support base body and the mass body is decreased, and thus it is not possible to have a large amount of displacement (amplitude) of the mass body. For this reason, there is a problem in which detection sensitivity is not high.

SUMMARY

The invention can be realized as the following forms or application examples.

APPLICATION EXAMPLE 1

According to this application example, there is provided a functional element including a first base body; a coupling section which is coupled to the first base body; a support body which extends from the coupling section; a mass body which is coupled to the support body; a drive electrode which is provided on a surface side that faces the mass body of the first base body; a detection working electrode which extends from the support body; and a detection fixed electrode which is coupled to the first base body and faces at least a portion of the detection working electrode, in which the mass body can be displaced in a direction which intersects a main surface of the mass body, and in which, when a distance between the first base body and the mass body is referred to as d1 and a distance between the first base body and the detection fixed electrode is referred to as d2, a relation of d1>d2 is satisfied.

In this case, the mass body can be displaced in a direction which intersects the main surface, and thereby the mass body can be easily driven by the vertical vibration which is vibration in a direction which intersects the main surface. In addition, the distance d1 between the first base body and the mass body is longer than the distance d2 between the first base body and the detection fixed electrode, and thereby the mass body which is driven by the vertical vibration can perform a large vibration displacement in a direction which intersects the main surface. Thus, since the mass body can be driven by the vertical vibration having a large vibration displacement (amplitude), in a case in which angular velocity of an internal surface axis rotation is applied, a large Coriolis force acts, an amount of change of a capacitance that is generated between the detection working electrode and the detection fixed electrode is increased, and thus it is possible to obtain the functional element having high detection sensitivity with respect to angular velocity of the internal surface axis rotation.

APPLICATION EXAMPLE 2

In the functional element according to the application example, it is preferable that a thick body section is provided in the first base body, the coupling section is provided in the thick body section, and in a planar view, the mass body and the thick body section are separated from each other.

In this case, the mass body is disposed on an upper surface of the thick body section of the first base body through the coupling section, and thereby the mass body can perform a larger vibration displacement up to a distance in which a height of the thick body section extending from the first base body is added to the distance d1 between the first base body and the mass body. In addition, since the mass body and the thick body section are separated from each other in a planar view, the mass body can vibrate without being in contact with the thick body section.

APPLICATION EXAMPLE 3

In the functional element according to the application example, it is preferable that at least a portion of the detection fixed electrode is provided in the thick body section.

In this case, since the detection fixed electrode is provided on the thick body section of the first base body, the detection fixed electrode, and the detection working electrode which extends from the support body that is disposed on the thick body section of the first base body through the coupling section can be disposed so as to face each other, and thereby a capacitance can be formed between the detection working electrode and the detection fixed electrode.

APPLICATION EXAMPLE 4

In the functional element according to the application example, it is preferable that a thickness of the detection working electrode is thicker than that of the mass body.

In this case, a thickness of the detection working electrode is thicker than that of the mass body, and thereby it is possible to lengthen a distance in which a main surface of the mass body and a main surface of the first base body face each other, and to increase an area in which the detection working electrode and the detection fixed electrode face each other. That is, while vibration displacement of the mass body is increased, a capacitance between the detection working electrode and the detection fixed electrode which are electrodes for detection can be increased, and it is possible to obtain the functional element having high detection sensitivity.

APPLICATION EXAMPLE 5

In the functional element according to the application example, it is preferable that, when the mass body is vibrated by an AC voltage which is applied between the mass body and the drive electrode, and angular velocity of axis rotation in a direction along the main surface of the mass body and the direction in which the detection working electrode extends is applied to the mass body, the detection working electrode vibrates in a direction which intersects the direction.

In this case, by Coriolis force which is generated by angular velocity of an internal surface axis rotation, the mass body performs vibration displacement in a direction that intersects a direction in which the detection working electrode extends, and thereby the detection working electrode that extends from the support body which is coupled to the mass body also performs vibration displacement in the same direction as the mass body, and an interval between the detection fixed electrode and the detection working electrode is changed. For this reason, a capacitance between the detection working electrode and the detection fixed electrode is changed, and thereby angular velocity of the internal surface axis rotation can be detected by measuring an amount of change of the capacitance between the electrodes. That is, the functional element can be used as an angular velocity sensor which detects angular velocity of the internal surface axis rotation.

APPLICATION EXAMPLE 6

In the functional element according to the application example, it is preferable that the support body includes a first elasticity section which is coupled to the coupling section, and a second elasticity section which is coupled to the mass body, and a thickness of the first elasticity section is thicker than a thickness of the second elasticity section, in a sectional view.

In this case, since a thickness of the first elasticity section is thicker than a thickness of the second elasticity section in a sectional view, a bending stiffness in a thickness direction of the first elasticity section is higher than that of the second elasticity section, and thereby, based on vibration in which the mass body performs vibration displacement in a direction that intersects a main surface, it is possible to suppress that the detection working electrode which is coupled to the support body performs vibration displacement in the direction that intersects a main surface.

APPLICATION EXAMPLE 7

According to this application example, there is provided a method of manufacturing a functional element including forming a second concave section in a second base body by processing the second base body; disposing a drive electrode on a first base body; bonding together a surface having the second concave section which is provided in the second base body and a surface having the drive electrode of the first base body; and forming a coupling section, a support body, a mass body, a detection working electrode, and a detection fixed electrode by processing the second base body, in which, the forming of the coupling section, the support body, the mass body, the detection working electrode, and the detection fixed electrode includes forming the mass body in the second concave section.

In this case, since the mass body is formed in the second concave section, a distance between a main surface of the mass body and a main surface of the first base body can be lengthened, the mass body can perform a large vibration displacement in a direction which intersects the main surface of the mass body, and thereby it is possible to manufacture the functional element having high detection sensitivity.

APPLICATION EXAMPLE 8

In the method of manufacturing a functional element according to the application example, it is preferable that the method further includes forming a first concave section in the first base body, the disposing of the drive electrode includes forming the drive electrode in the first concave section, and the bonding includes bonding together the first concave section and the second concave section so as to face each other.

In this case, since the drive electrode is formed in the first concave section, and the first concave section and the second concave section are bonded together so as to face each other, the mass body and the drive electrode can be disposed so as to face each other, a gap area in which the mass body can perform vibration displacement is further widened, the mass body can perform a larger vibration displacement in a direction which intersects a main surface, and thereby it is possible to manufacture the functional element having high detection sensitivity.

APPLICATION EXAMPLE 9

According to this application example, there is provided an electronic apparatus including the functional element according to the above application examples.

According to the present application example, it is possible to realize an accurate electronic apparatus by providing a functional element having high detection sensitivity.

APPLICATION EXAMPLE 10

According to this application example, there is provided a mobile object including the functional element according to the above application examples.

According to the present application example, it is possible to realize a mobile object having excellent safety by providing a functional element having high detection sensitivity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the drawings. In the respective figures which will be described hereinafter, the respective configuration elements have a magnitude which can be substantially recognized, and thus there is a case in which dimensions and ratios of the respective configuration elements are described so as to be substantially different from dimensions and ratios of actual configuration elements.
Functional Element As an example of a functional element according to the present embodiment, an angular velocity sensor which is driven by a vertical vibration and detects angular velocity of internal surface axis rotation will be described with reference to drawings.

Figure 1:
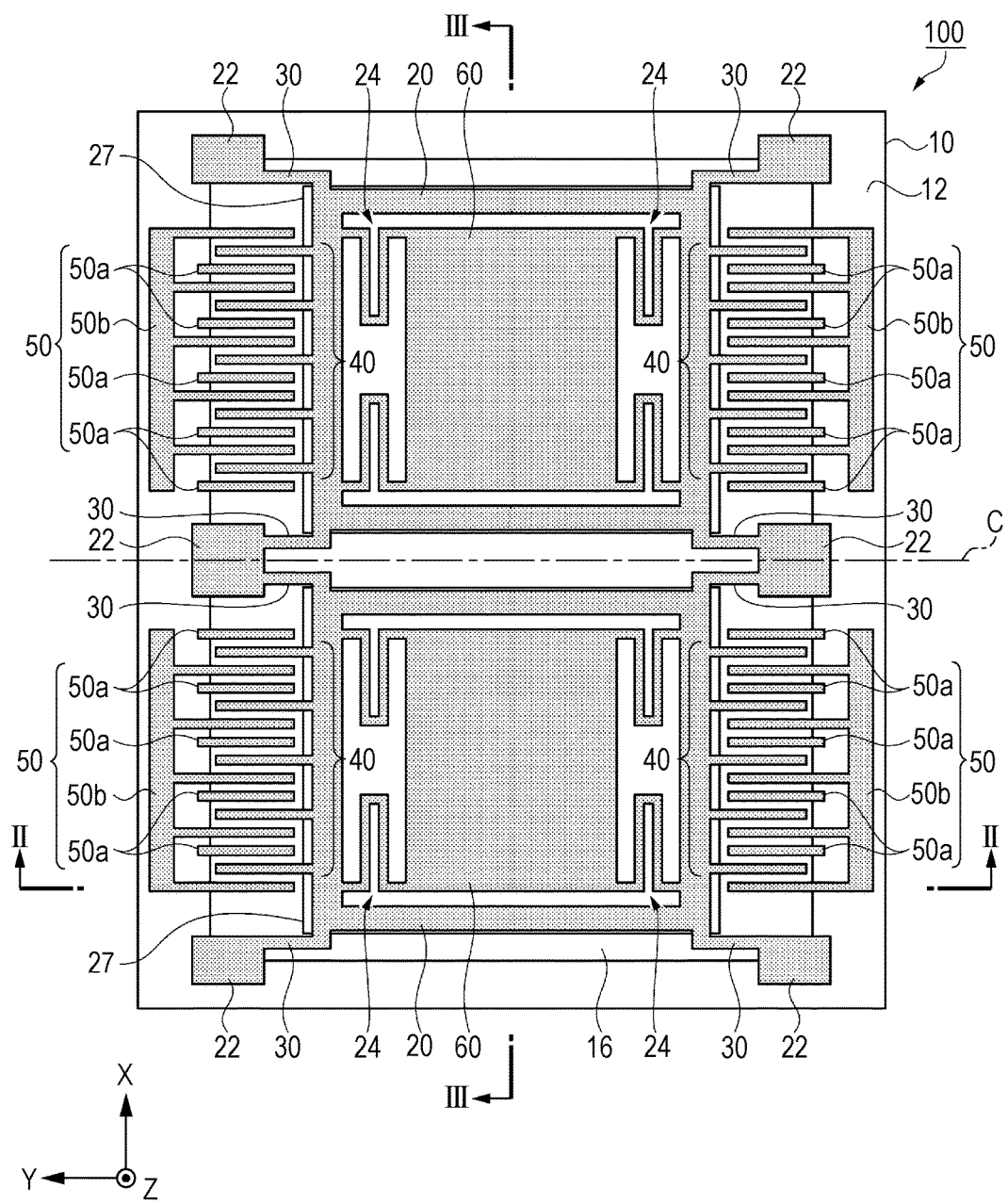
FIG. 1 is a schematic plan diagram illustrating a schematic structure of an angular velocity sensor according to the present embodiment.
Figure 2:
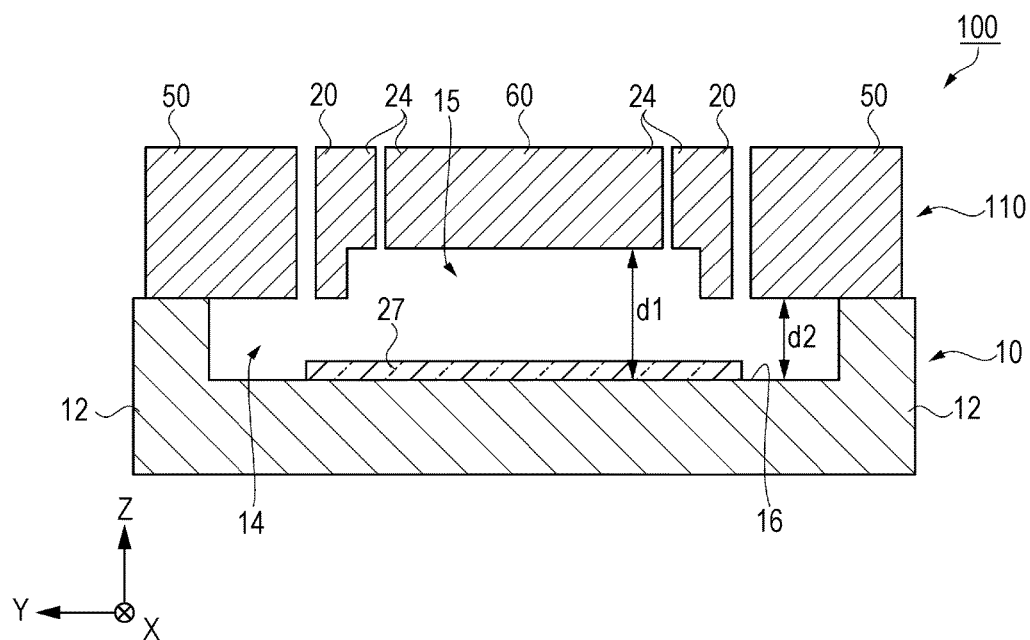
FIG. 2 is a schematic sectional diagram taken along line II-II in FIG. 1.

FIG. 1 is a schematic plan diagram illustrating a schematic structure of an angular velocity sensor 100 which is used as a functional element according to the present embodiment. FIG. 2 is a schematic sectional diagram taken along line II-II in FIG. 1. In addition, in the following respective figures, for convenience, as three axes which are orthogonal to one another, an X axis, a Y Axis, and a Z axis are illustrated, a tip side of an arrow which is illustrated is referred to as "+side", and a base end side is referred to as "−side". In addition, a direction which is parallel to the X axis is referred to as an "X-axis direction", a direction which is parallel to the Y axis is referred to as a "Y-axis direction", and a direction which is parallel to the Z axis is referred to as a "Z-axis direction". Furthermore, for convenience, in a planar view which is viewed from the Z-axis direction, a surface of the Z-axis direction will be described as a main surface, a +Z-axis side will be described as an upper surface, and a −Z axis side will be described as a lower surface.

The angular velocity sensor 100 according to the present embodiment has a structure in which two structural bodies are arranged in parallel, and has a configuration in which the two structural bodies are line-symmetrical to a center line C in FIG. 1. For this reason, description of the structural body on the +X direction side will be omitted, and a structure and an operation of the angular velocity sensor 100 will be made using the structural body on the −X direction side.

The angular velocity sensor 100 is an angular velocity sensor (capacitance type MEMS angular velocity sensor element) which detects angular velocity of a Y-axis rotation which is an internal surface axis, and as illustrated in FIG. 1 and FIG. 2, is configured to include a first base body 10 which includes drive electrodes 27 in first concave sections 14, and a second base body 110 on which a mass body 60 and a support body 20 are formed.

In the first base body 10, a thick body section 12 of a ring shape is provided along an outer edge section of the first base body 10, and the first concave sections 14 are configured on a side which faces the second base body 110. That is, a bottom surface 16 is provided in the first concave section 14 of the first base body 10, and on an upper surface of the bottom surface 16 which configures the first concave section 14, a drive electrode 27 is formed in a position which faces the mass body 60 that is provided on the second base body 110 which will be described later.

A material of the first base body 10 is, for example, glass or silicon, and a material of the drive electrode 27 is, for example, aluminum, gold, indium tin oxide (ITO), or the like.

It is preferable that a material of the drive electrode 27 is a transparent electrode material such as ITO. By using a transparent electrode material as the drive electrode 27, in a case in which the first base body 10 is a transparent substrate (glass substrate), foreign matter or the like which exists on an upper surface of the drive electrode 27 can be easily viewed from a lower surface side of the first base body 10.

The second base body 110 is configured to include coupling sections 22, the support body 20 which includes first elasticity sections 30 and second elasticity sections 24, a mass body 60, detection working electrodes 40, and detection fixed electrodes 50. In addition, in the second base body 110, a second concave section 15 is formed in the mass body 60 and the second elasticity sections 24 on a side facing the first base body 10.

The coupling section 22 is coupled to an upper surface of the thick body section 12 of the first base body 10. The coupling section 22 may be fixed (bonded) to the upper surface of the thick body section 12. The coupling section 22 supports the support body 20 which extends from the coupling section 22, and the mass body 60 and the detection working electrode 40 which are coupled to the support body 20. In the example illustrated in FIG. 1, four coupling sections 22 per one support body 20 are provided, but if the support body 20 can support it, the number of the coupling sections 22 is not particularly limited.

The support body 20 has a ring shape which encloses the mass body 60, and is configured to include the first elasticity section 30 which is coupled to the coupling section 22, and the second elasticity section 24 which is coupled to the mass body 60.

The first elasticity section 30 extends from the coupling section 22 in the Y-axis direction which is a direction that intersects a direction in which the mass bodies 60 are arranged in parallel, is coupled to the support body 20, and is configured so as to perform vibration displacement of the support body 20 to which the mass body 60 and the detection working electrode 40 are coupled, along the X-axis direction which is a direction in which the mass bodies 60 are arranged in parallel. In the example illustrated in FIG. 1, four first elasticity sections 30 per one support body 20 are provided, but if vibration displacement of the support body 20 can be performed in the X-axis direction, the number of the first elasticity sections 30 is not particularly limited.

The second elasticity section 24 extends from the support body 20 in the Y-axis direction, while reciprocating in the X-axis direction, is coupled to the mass body 60, and is configured perform vibration displacement of the mass body 60 only in the Z-axis direction, without vibration displacement of the support body 20 in the Z-axis direction. Thus, the second elasticity section 24 extends from the support body 20 in the X-axis direction, while reciprocating in the Y-axis direction, and may be configured to be coupled to the mass body 60. In the example illustrated in FIG. 1, four second elasticity sections 24 per one mass body 60 are provided, but if vibration displacement of the mass body 60 can be performed in the Z-axis direction which is a direction that intersects a main surface, the number of the second elasticity sections 24 is not particularly limited.

A thickness (length of Z-axis direction) of the first elasticity section 30 is configured to be thicker than a thickness (length of Z-axis direction) of the second elasticity section 24, in a sectional view. That is, as illustrated in FIG. 2, the second elasticity section 24 is formed in the second concave section 15 which is formed in the second base body 110, and thereby the first elasticity section 30 can be thicker than the second elasticity section 24. For this reason, a bending stiffness in the Z-axis direction which is a thickness direction of the first elasticity section 30 is stronger than the second elasticity section 24, and thus it is possible to suppress vibration displacement of the detection working electrode 40, which is coupled to the support body 20, in the Z-axis direction, by vibration in which vibration displacement of the mass body 60 is performed in the Z-axis direction.

The mass body 60 is coupled to the support body 20 through the second elasticity section 24. For this reason, bending stiffness in the Z-axis direction is supported by a low second elasticity section 24, and thus the mass body 60 is configured so as to perform vibration displacement in the Z-axis direction which is a direction that intersects a main surface. For this reason, by being supported by the second elasticity section 24 in which vibration displacement is easily performed in the Z-axis direction, the mass body 60 can be displaced in the Z-axis direction. A thickness (length of Z-axis direction) of the mass body 60, as illustrated in FIG. 2, is provided in the second concave section 15 which is formed in the second base body 110, and thus, is thinner than a thickness (length of Z-axis direction) of the support body 20 and the detection working electrode 40 which extends from the support body 20. In the example illustrated in FIG. 1, a planar shape of the mass body 60 is a rectangular shape, but may be a polygonal shape or a circular shape.

The detection working electrodes 40 extend from the support body 20 in the Y-axis direction, and in the example illustrated in FIG. 1, respectively extend from a side opposite to a side to which the second elasticity section 24 of the support body 20 is coupled, in a +Y-axis direction and a −Y-axis direction.

The detection fixed electrode 50 is coupled to an upper surface of the thick body section 12 which is an upper surface of the first base body 10. The detection fixed electrode 50 may be fixed (bonded) to the upper surface of the thick body section 12. The detection fixed electrode 50 extends from a side which is coupled to the thick body section 12 in the Y-axis direction, and faces the detection working electrode 40 through a gap. In the example illustrated in FIG. 1, a detection fixed electrode 50b is provided on a −X-axis direction side of the detection working electrode 40, and a detection fixed electrode 50a is provided on a +X-axis direction side of the detection working electrode 40.

The detection fixed electrode 50 faces the detection working electrode 40 in the X-axis direction. A side surface (a surface which faces the X-axis direction) of the detection fixed electrode 50 is in parallel with, for example, a side surface (a surface which faces the X-axis direction) of the detection working electrode 40. The side surface of the detection fixed electrode 50 and the side surface of the detection working electrode 40 may be in parallel with a YZ-axis surface which is orthogonal to the X axis.

The support body 20 which includes the first elasticity section 30 and the second elasticity section 24, the mass body 60, and the detection working electrode 40 which are disposed on the first concave section 14 of the first base body 10, and are separated from the first base body 10, by the coupling section 22 which is coupled to an upper surface of the thick body section 12 of the first base body 10. The mass body 60 is formed in the second concave section 15 of the second base body 110. Here, a distance d1 between the first base body 10 and the mass body 60 is longer than a distance d2 between the first base body 10 and the detection fixed electrode 50. For this reason, the mass body 60 can perform a large vibration displacement in the Z-axis direction which is a direction that is orthogonal to a main surface.

The mass body 60 and the drive electrode 27 are disposed so as to face each other, and thereby if a voltage is applied to the mass body 60 and the drive electrode 27, electrostatic force is generated between the mass body 60 and the drive electrode 27, vibration can be produced by repeating approach and separation of the mass body 60 on the drive electrode 27 side. By doing this, it is possible to perform a vertical vibration of the mass body 60 in the Z-axis direction.

The mass body 60 vibrates in the Z-axis direction by an AC voltage which is applied between the mass body 60 and the drive electrode 27, and when angular velocity of Y-axis rotation is applied in the Y-axis direction which is a direction in which the detection working electrode 40 extends, Coriolis force is applied to the mass body 60, and the mass body 60 performs vibration displacement in the X-axis direction. That is, in a state in which the mass body 60 vibrates in the Z-axis direction, if angular velocity of Y-axis rotation is applied, the Coliolis force is applied to the mass body 60, the mass body 60 performs vibration displacement in the X-axis direction, and thus the detection working electrode 40 which is coupled to the mass body 60 through the support body 20 also performs vibration displacement in the same direction as that of the mass body 60. For this reason, by measuring a capacitance between the detection working electrode 40 and the detection fixed electrode 50, angular velocity can be detected, and thereby it is possible to obtain a function as an angular velocity sensor 100.

The materials of the coupling section 22 of the second base body 110, the support body 20 which includes the first elasticity section 30 and the second elasticity section 24, the mass body 60, the detection working electrode 40, and the detection fixed electrode 50 are silicon to which conductivity is added by doping impurities, such as phosphorus, or boron. The coupling section 22 of the second base body 110, the support body 20 which includes the first elasticity section 30 and the second elasticity section 24, the mass body 60, the detection working electrode 40, and the detection fixed electrode 50 are formed by integrally processing one substrate (for example, silicon substrate) using a photolithography method and an etching method.

A method of bonding the coupling section 22 and the detection fixed electrode 50 of the second base body 110 to the first base body 10 is not particularly limited, and for example, in a case in which a material of the first base body 10 is glass and a material of the coupling section 22 and the detection fixed electrode 50 of the second base body 110 is silicon, the first base body 10 can be anodically bonded to the coupling section 22 and the detection fixed electrode 50 of the second base body 110.

Operation Principle of Functional Element

Next, an operation principle of the angular velocity sensor 100 that is used as a functional element will be described in detail using FIG. 1 and FIG. 3 to FIG. 7.

Figure 3:
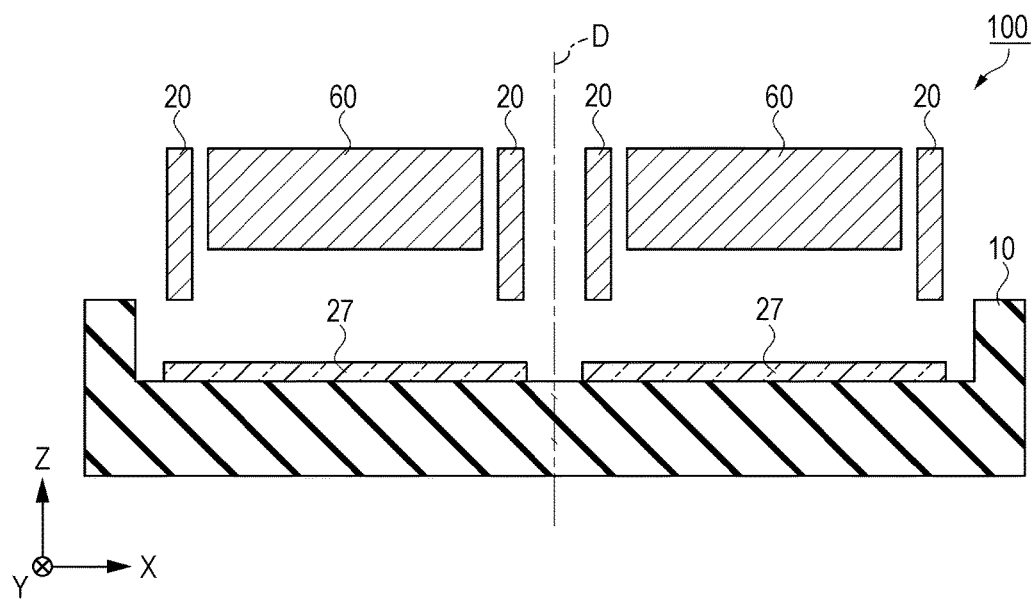
FIG. 3 is a schematic sectional diagram taken along line III-III in FIG. 1.
Figure 4:
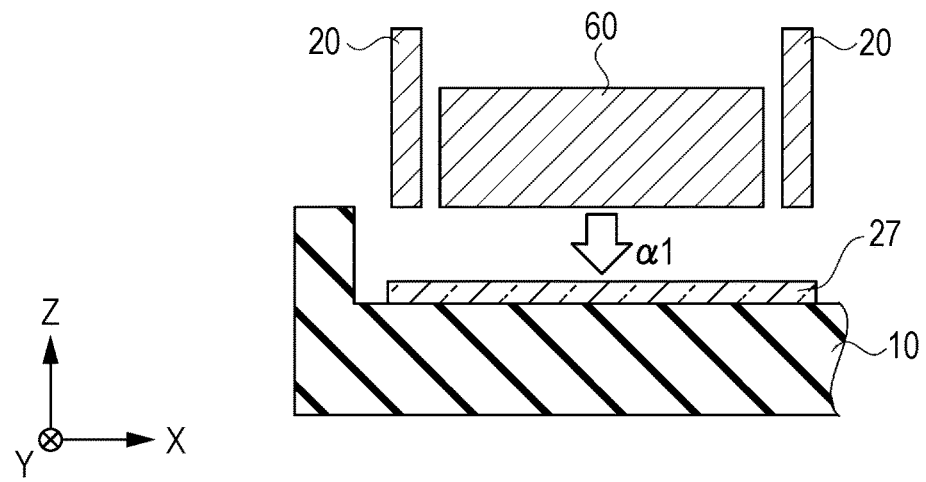
FIG. 4 is a schematic sectional diagram illustrating an operation of an angular velocity sensor according to the present embodiment.
Figure 5:
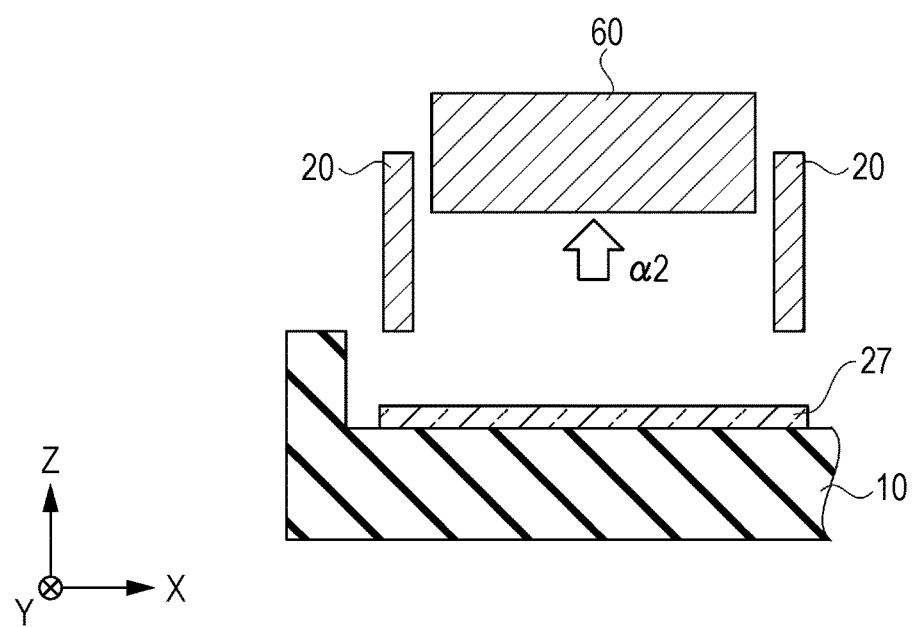
FIG. 5 is a schematic sectional diagram illustrating an operation of an angular velocity sensor according to the present embodiment.
Figure 6:
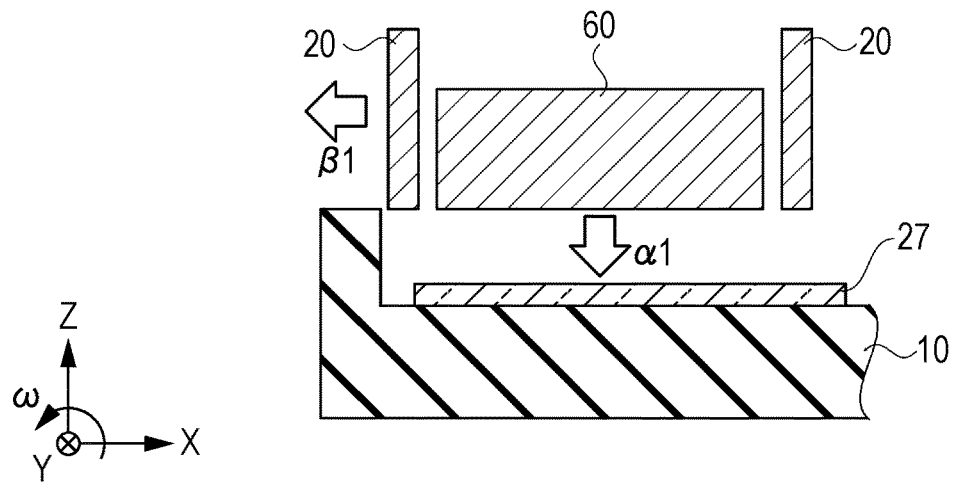
FIG. 6 is a schematic sectional diagram illustrating an operation of an angular velocity sensor according to the present embodiment.
Figure 7:
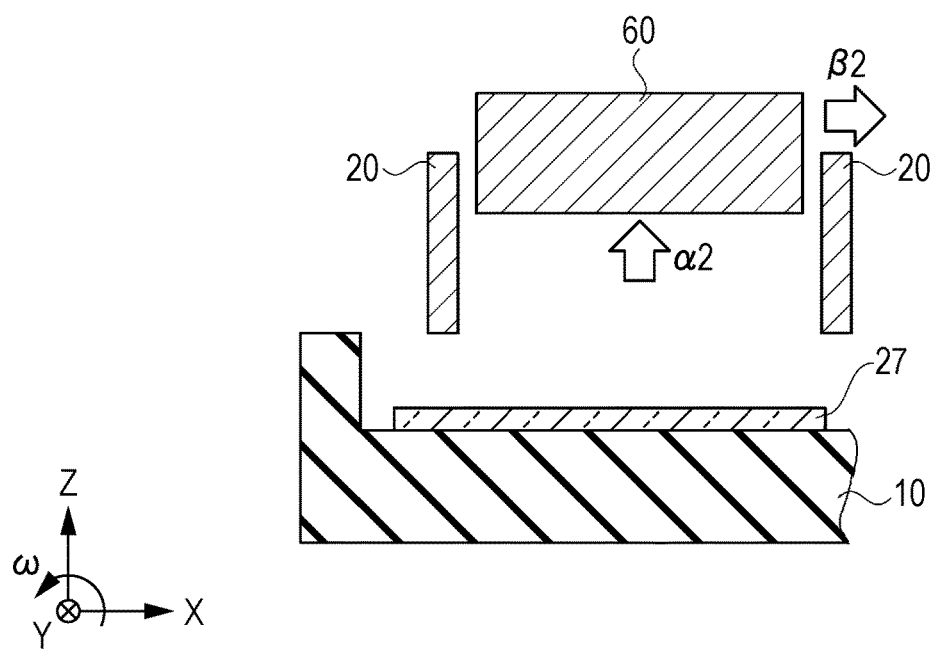
FIG. 7 is a schematic sectional diagram illustrating an operation of an angular velocity sensor according to the present embodiment.

FIG. 3 is a schematic sectional diagram taken along the line III-III in FIG. 1. FIG. 4 to FIG. 7 are schematic sectional diagrams illustrating an operation of the angular velocity sensor 100 according to the present embodiment. FIG. 3 illustrates a structure in which the angular velocity sensor 100 is line-symmetric to a center line D, and thus FIG. 4 to FIG. 7 illustrate only structural bodies on the −X axis side of FIG. 3, and operations thereof will be described.

If a voltage is applied to the mass body 60 and the drive electrode 27, an electrostatic force can be generated between the mass body 60 and the drive electrode 27. By doing this, the mass body 60 repeats approach and separation with respect to the drive electrode 27, and it is possible to perform a vertical vibration in which vibration displacement is performed in the Z-axis direction which is a direction that intersects a main surface. More specifically, by applying an Ac voltage between the mass body 60 and the drive electrode 27, the mass body 60 can vibrate in the Z-axis direction at a predetermined frequency. In the example illustrated in FIG. 4, the mass body 60 performs vibration displacement in an α1 direction (−Z-axis direction). In the example illustrated in FIG. 5, the mass body 60 performs vibration displacement in an α2 direction (+Z-axis direction) which is a direction opposite to the α1 direction (−Z-axis direction).

The mass body 60 on the +X-axis direction side, description of which is omitted has a direction of vibration displacement which is opposite to the mass body 60 on the −X-axis direction side, and for example, when the mass body on the +X-axis direction side performs vibration displacement in the α1 direction (−Z-axis direction), the mass body 60 on the −X-axis direction side performs vibration displacement in the α2 direction (+Z-axis direction). That is, the mass body 60 on the +X-axis side direction and the mass body 60 on the −X-axis side direction which are arranged in parallel with each other vibrate in a reverse-phase with each other.

In a state in which the mass body 60 vibrates in the Z-axis direction, if angular velocity ω of Y-axis rotation is applied to the angular velocity sensor 100, the Coriolis force is applied to the mass body 60, and the mass body 60 performs vibration displacement in the X-axis direction. In the example illustrated in FIG. 6, the mass body 60 performs vibration displacement in the α1 direction (−Z-axis direction), and thus the mass body 60 performs vibration displacement in a β1 direction (−X-axis direction) by the Coriolis force. In the example illustrated in FIG. 7, the mass body 60 performs vibration displacement in the α2 direction (+Z-axis direction), and thus the mass body 60 performs vibration displacement in a β2 direction (+X-axis direction) which is a direction opposite to the β1 direction (−X-axis direction), by the Coriolis force. For this reason, the detection working electrode 40 which extends from the support body 20 that is integral to the mass body 60 also performs vibration displacement in the same direction as the mass body 60.

If the angular velocity ω of the Y-axis rotation is applied to the angular velocity sensor 100, and thereby the detection working electrode 40 performs vibration displacement in the β1 direction (−X-axis direction), a distance between the detection working electrode 40 and the detection fixed electrode 50b is shortened, and a capacitance C2 between the detection working electrode 40 and the detection fixed electrode 50b increases. In addition, if the detection working electrode 40 performs vibration displacement in the β1 direction (−X-axis direction), a distance between the detection working electrode 40 and the detection fixed electrode 50b is lengthened, and a capacitance C1 between the detection working electrode 40 and the detection fixed electrode 50b decreases. Thus, if the capacitance C2 and the capacitance C1 are respectively converted into voltages by a C/V conversion circuit (capacitance/voltage conversion circuit, not illustrated), and are amplified by a differential amplifier (not illustrated), it is possible to detect a magnitude of the angular velocity ω of the Y-axis rotation from an output voltage (AC) of the amplified value.

Even in a case in which the detection working electrode 40 performs vibration displacement in the β2 direction (+X-axis direction), a distance between the detection working electrode 40 and the detection fixed electrode 50a, and a distance between the detection working electrode 40 and the detection fixed electrode 50b become reverse to the distances described above, but in the same manner as described above, it is possible to detect a magnitude of angular velocity ω of the Y-axis rotation. In addition, by detecting an output voltage of a differential amplifier using a synchronous detector (not illustrated), a rotation direction of angular velocity ω can also be detected.

If a distance in which the mass body 60 performs vibration displacement in the Z-axis direction is lengthened, in a case in which a frequency of vibration is constant, displacement velocity of the mass body 60 which vibrates can be increased, and thereby the Coriolis force at the time of adding the angular velocity increases. For this reason, an amount of displacement of the detection working electrode 40 is also increased, and thereby an amount of change of the capacitance between the detection working electrode 40 and the detection fixed electrode 50 can also be increased, and detection sensitivity can be increased. Thus, it is possible to obtain the angular velocity sensor 100 having a higher detection sensitivity.

In the description above, a form (electrostatic driving method) of driving the mass body 60 using the electrostatic force is described, but a method of driving the mass body 60 is not particularly limited, and a piezoelectric driving method, an electromagnetic driving method using Lorentz force of a magnetic field, or the like can be applied to the method.

In addition, in the angular velocity sensor 100 according to the present embodiment, an AC voltage is applied to the mass body 60 and the drive electrode 27, the mass body 60 vibrates in the Z-axis direction, and thereby angular velocity of an internal surface axis (Y axis) rotation is detected as a change of a capacitance between the detection working electrode 40 and the detection fixed electrode 50. However, in contrast to this, an AC voltage is applied to the detection working electrode 40 and the detection fixed electrode 50, the mass body 60 vibrates in the X-axis direction, and thereby angular velocity of an internal surface axis (Y axis) rotation may be configured to be detected as a change of a capacitance between the mass body 60 and the drive electrode 27.

The angular velocity sensor 100 according to the present embodiment has, for example, the following characteristics.

According to the angular velocity sensor 100 of the present embodiment, the mass body 60 can be displaced in a direction which intersects a main surface, and thereby the mass body 60 can be easily driven by a vertical vibration which is vibration in a direction (Z-axis direction) which intersects the main surface. In addition, a distance d1 between the first base body 10 and the mass body 60 is lengthened more than a distance d2 between the first base body 10 and the detection fixed electrode 50, and thereby the mass body 60 which is driven by a vertical vibration can perform a large vibration displacement in the Z-axis direction which is a direction that intersects the main surface. Thus, since the mass body 60 can be driven by a vertical vibration having a large amount of displacement (amplitude), in a case in which the angular velocity of the Y-axis rotation which is an internal surface axis is applied, a large Coriolis force acts, an amount of change of a capacitance that is generated between the detection working electrode 40 and the detection fixed electrode 50 is increased, and thus it is possible to obtain the angular velocity sensor 100 having a high detection sensitivity with respect to angular velocity of the Y-axis rotation.

In addition, the mass body 60 is disposed on an upper surface of the thick body section 12 of the first base body 10 through the coupling section 22, and thereby the mass body 60 can perform a larger vibration displacement up to a distance in which a height of the thick body section 12 extending from the first base body 10 is added to the distance d1 between the first base body 10 and the mass body 60. In addition, since the mass body 60 and the thick body section 12 are separated from each other in a planar view, the mass body 60 can vibrate without being in contact with the thick body section 12.

In addition, since the detection fixed electrode 50 is provided on an upper surface of the thick body section 12 of the first base body 10, the detection fixed electrode 50 and the detection working electrode 40 which extends from the support body 20 that is disposed on an upper surface of the thick body section 12 of the first base body 10 through the coupling section 22 can be disposed so as to face each other, and thereby a capacitance can be formed between the detection working electrode 40 and the detection fixed electrode 50.

In addition, a thickness of the detection working electrode 40 is thicker than that of the mass body 60, and thereby it is possible to lengthen a distance in which a main surface of the mass body 60 and a main surface of the first base body 10 face each other, and to increase an area in which the detection working electrode 40 and the detection fixed electrode 50 face each other. That is, while vibration displacement of the mass body 60 is increased, a capacitance between the detection working electrode 40 and the detection fixed electrode 50 which are electrodes for detection can be increased, and it is possible to obtain the angular velocity sensor 100 having a high detection sensitivity.

In addition, by the Coriolis force which is generated by angular velocity of the Y-axis rotation which is an internal surface axis, the mass body 60 performs vibration displacement in the X-axis direction which is a direction that intersects a direction in which the detection working electrode 40 extends, and thereby the detection working electrode 40 which extends from the support body 20 which is coupled to the mass body 60 also performs vibration displacement in the same direction as the mass body 60, and an interval between the detection fixed electrode 50 and the detection working electrode 40 is changed. For this reason, a capacitance between the detection working electrode 40 and the detection fixed electrode 50 is changed, and thereby angular velocity of the Y-axis rotation can be detected by measuring an amount of change of the capacitance between the electrodes.

In addition, since a thickness of the first elasticity section 30 is thicker than a thickness of the second elasticity section 24 in a sectional view, a bending stiffness in a thickness direction (Z-axis direction) of the first elasticity section 30 is higher than that of the second elasticity section 24, and thereby, based on vibration in which the mass body 60 performs vibration displacement in the Z-axis direction which is a direction that intersects a main surface, it is possible to suppress that the detection working electrode 40 which is coupled to the support body 20 performs vibration displacement in the Z-axis direction.

Method of Manufacturing Functional Element

Next, an example of a method of manufacturing the angular velocity sensor 100 as a functional element according to the present embodiment will be described with reference to FIG. 1, and FIG. 8 to FIG. 11.

Figure 8:
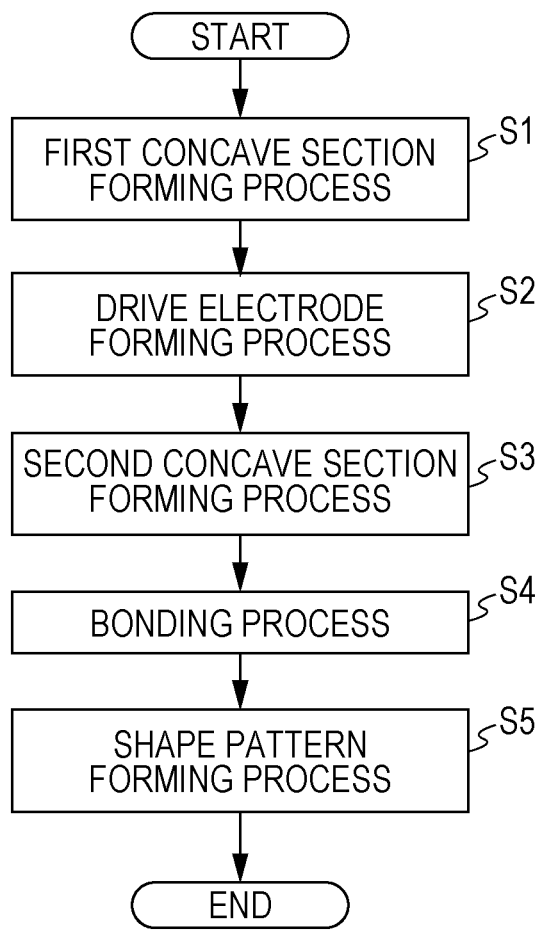
FIG. 8 is a flowchart illustrating important manufacturing processes of an angular velocity sensor according to the present embodiment.
Figure 9:
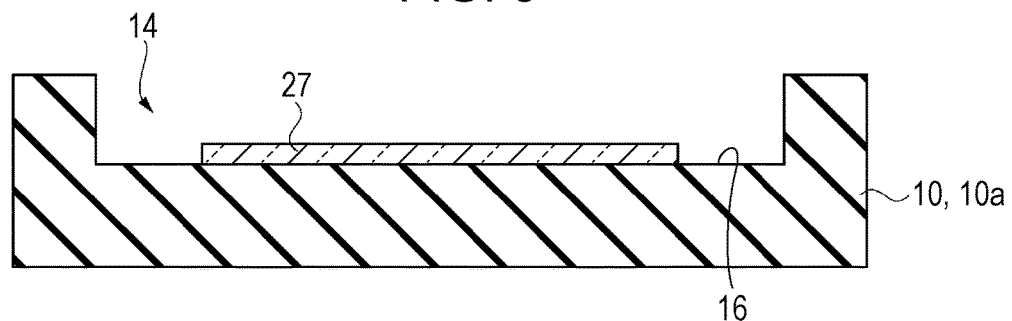
FIG. 9 is a schematic sectional diagram illustrating a manufacturing process of an angular velocity sensor according to the present embodiment.
Figure 10:
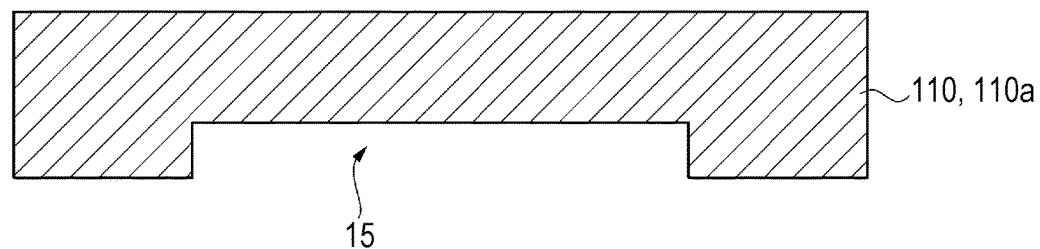
FIG. 10 is a schematic sectional diagram illustrating a manufacturing process of an angular velocity sensor according to the present embodiment.
Figure 11:
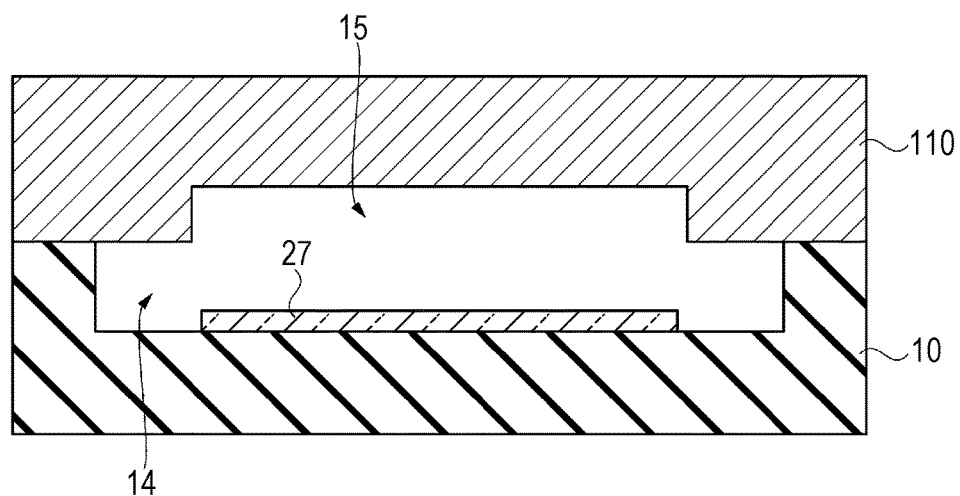
FIG. 11 is a schematic sectional diagram illustrating a manufacturing process of an angular velocity sensor according to the present embodiment.

The FIG. 8 is a flowchart illustrating important manufacturing processes of the angular velocity sensor 100 according to the present embodiment. FIG. 9 to FIG. 11 are schematic sectional diagrams illustrating manufacturing processes of the angular velocity sensor 100 according to the present embodiment.

First Concave Section Forming Process S1

To begin with, in a first concave section forming process (S1), a first concave section 14 is formed in a glass substrate 10a by etching the glass substrate 10a, and thereby the first base body 10 is obtained. The etching is performed by, for example, wet etching. By the present process, the first base body 10 having the thick body section 12 and the bottom surface 16 can be prepared.

Drive Electrode Forming Process S2

Next, in a drive electrode forming process (S2), as illustrated in FIG. 9, the drive electrode 27 is formed on the bottom surface 16 of the first concave section 14. A conductive layer is formed on the bottom surface 16 using a sputtering method, and thereafter the conductive layer is patterned using a photolithography method and an etching method, and thereby the drive electrode 27 is formed.

Second Concave Section Forming Process S3

Next, in a second concave section forming process (S3), as illustrated in FIG. 10, a second concave section 15 is formed in a silicon substrate 110a by etching the silicon substrate 110a, and thereby the second base body 110 is obtained. The etching is performed by, for example, dry etching. By the present process, the second base body 110 in which the second concave section 15 is provided can be prepared.

Bonding Process S4

Next, in a bonding process S4 in which the first base body 10 and the second base body 110 are bonged together, as illustrated in FIG. 11, a side in which the first concave section 14 of the first base body 10 is opened, and a side in which the second concave section 15 of the second base body 110 is opened are bonded together so as to face each other. Bonding of the first base body 10 and the second base body 110 is performed by anodic bonding or the like. Areas to be bonded are the thick body section 12 of the first base body 10, the coupling section 22 of the second base body 110 which will be formed in the subsequent process, and the detection fixed electrode 50. In the bonding process, the first concave section 14 and the second concave section 15 are bonded together in such a manner that openings thereof face each other, and thereby a wide gap in which the mass body 60 can perform a large vibration displacement in the Z-axis direction is configured.

Shape Pattern Forming Process S5

Next, in a shape pattern forming process (S5) in which the coupling section 22, the support body 20 which includes the first elasticity section 30 and the second elasticity section 24, the mass body 60, the detection working electrode 40, and the detection fixed electrode 50 are formed, the second base body 110 is patterned (etched) in a desired shape, and thereby, the coupling section 22, the support body 20 which includes the first elasticity section 30 and the second elasticity section 24, the mass body 60, the detection working electrode 40, and the detection fixed electrode 50 are formed. The patterning is performed using a photolithography technique and etching technology (dry etching), and as a more specific etching technology, a Bosch method can be used. In the present process, by patterning (etching) the second base body 110, the coupling section 22, the support body 20 which includes the first elasticity section 30 and the second elasticity section 24, the mass body 60, the detection working electrode 40, and the detection fixed electrode 50 are integrally formed.

By the manufacturing method described above, the coupling section 22 is bonded to the thick body section 12, and thereby the support body 20 in which the first elasticity section 30 and the second elasticity section 24 are included, the mass body 60, and the detection working electrode 40 can be separated from the first base body 10, and it is possible to perform vibration displacement of the mass body 60 in the Z-axis direction, or vibration displacement of the detection working electrode 40 in the X-axis direction.

In addition, the detection fixed electrode 50 is bonded to the thick body section 12, and thereby it is possible to easily perform an electrical insulation of the detection working electrode 40 and the detection fixed electrode 50, and to easily form a capacitance between the detection working electrode 40 and the detection fixed electrode 50.

As described above, according to the method of manufacturing the angular velocity sensor 100 according to the present embodiment, the mass body 60 is formed in the second concave section 15 which is formed in the second base body 110, in the shape pattern forming process in which the coupling section 22, the support body 20, the mass body 60, the detection working electrode 40, and the detection fixed electrode 50 are formed. For this reason, a distance between a main surface of the mass body 60 and a main surface of the first base body 10 can be lengthened, the mass body 60 can perform a large vibration displacement in a direction which intersects the main surface of the mass body 60, and thereby it is possible to manufacture the angular velocity sensor 100 having a high detection sensitivity.

In addition, the method of manufacturing the angular velocity sensor 100 according to the present embodiment includes the first concave section forming process in which the first concave section 14 is formed in the first base body 10. In the drive electrode forming process, the drive electrode 27 is formed in the first concave section 14. In the bonding process, the first concave section 14 of the first base body 10 and the second concave section 15 of the second base body 110 are bonded together so as to face each other. For this reason, the mass body 60 and the drive electrode 27 can be disposed so as to face each other, a gap area in which the mass body 60 can perform vibration displacement is further widened, the mass body 60 can perform a larger vibration displacement in a direction (Z-axis direction) which intersects a main surface, and thereby it is possible to manufacture the angular velocity sensor 100 having a high detection sensitivity.

Electronic Apparatus

Next, an electronic apparatus which includes the functional element according to an embodiment of the invention will be described in detail using FIG. 12 to FIG. 14. In the present description, an example in which the angular velocity sensor 100 is used as a functional element is illustrated.

Figure 12:
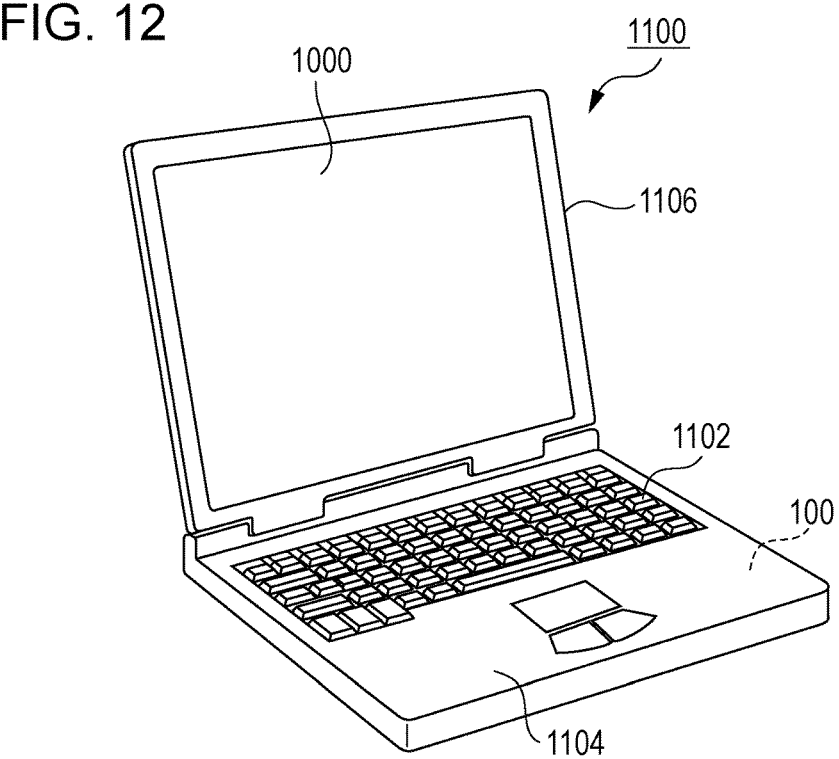
FIG. 12 is a perspective diagram illustrating a schematic configuration of a personal computer of a mobile type as an example of an electronic apparatus.

FIG. 12 is a perspective diagram illustrating a schematic configuration of a personal computer of a mobile type (or notebook type) as an example of an electronic apparatus which includes the angular velocity sensor 100 according to an embodiment of the invention.

In FIG. 12, a personal computer 1100 is configured to include a body section 1104 which includes a key board 1102, and a display unit 1106 which includes a display section 1000. The display unit 1106 is supported so as to be able to rotate with respect to the body section 1104 through a hinge structure section. The angular velocity sensor 100 which includes a function in which an angle at the time of rotating the personal computer 1100 is detected is embedded in the personal computer 1100.

Figure 13:
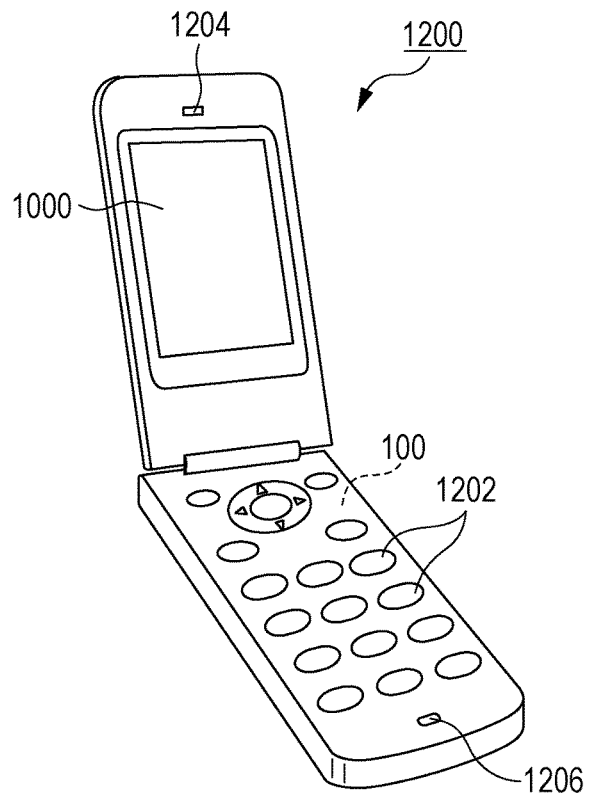
FIG. 13 is a perspective diagram illustrating a schematic configuration of a mobile phone as an example of an electronic apparatus.

FIG. 13 is a perspective diagram illustrating a schematic configuration of a mobile phone 1200 (including PHS) as an example of an electronic apparatus which includes the angular velocity sensor 100 according to an embodiment of the invention.

In FIG. 13, the mobile phone 1200 includes a plurality of operation buttons 1202, a voice receiving hole 1204, and a voice transmitting hole 1206. The display section 1000 is disposed between the operation buttons 1202 and the voice receiving hole 1204. The angular velocity sensor 100 which includes a function in which an angle at the time of rotating the mobile phone 1200 is detected is embedded in the mobile phone 1200.

Figure 14:
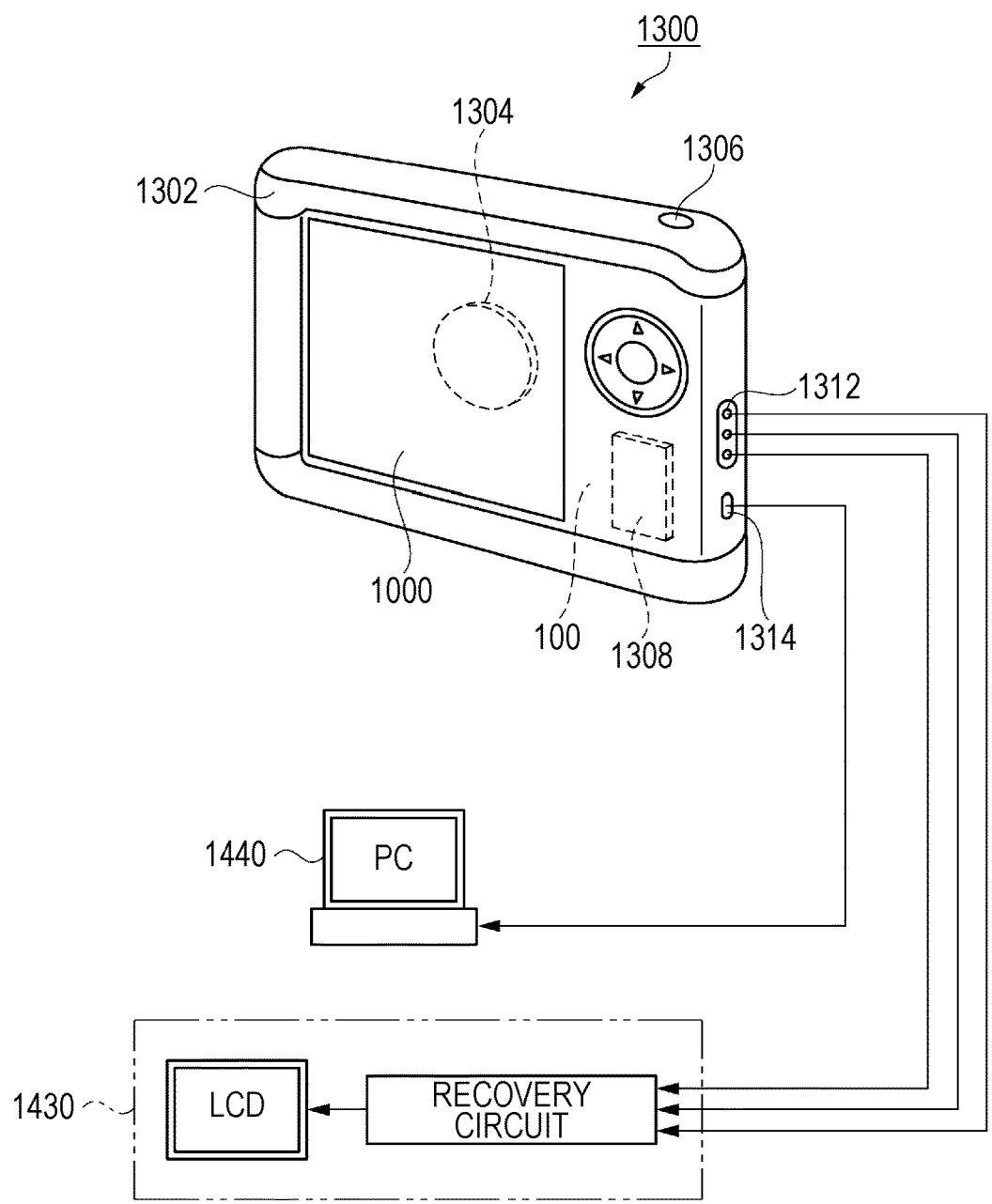
FIG. 14 is a perspective diagram illustrating a schematic configuration of a digital still camera as an example of an electronic apparatus.

FIG. 14 is a perspective diagram illustrating a schematic configuration of a digital still camera 1300 as an example of an electronic apparatus which includes the angular velocity sensor 100 according to an embodiment of the invention. FIG. 14 also simply illustrates with regard to a connection to an external apparatus. Here, while a film camera in the related art exposes a silver salt photographic film to light using an optical image of a subject, the digital still camera 1300 performs a photoelectric conversion of the optical image of the subject using an imaging device such as a charge coupled device (CCD) and generates an imaging signal (image signal).

The display section 1000 is provided on a back surface of a case (body) 1302 of the digital still camera 1300, and display is performed based on an imaging signal according to the CCD. The display section 1000 functions as a finder which displays the subject as an electronic image. In addition, a light receiving unit 1304 which includes an optical lens (imaging optical system), a CCD or the like is provided on a front surface side (rear side in the figure) of the case 1302.

If a photographer checks a subject image which is displayed on the display section 1000 and pushes a shutter button 1306, an imaging signal of the CCD at that time is transferred to a memory 1308 and is stored there. In addition, in the digital still camera 1300, a video signal output terminal 1312, and an input and output terminal 1314 for data communication are provided on a side surface of the case 1302. Then, as illustrated, a television monitor 1430 is connected to the video signal output terminal 1312, and a personal computer 1440 is connected to the input and output terminal 1314 for data communication, as necessary. Furthermore, the digital still camera 1300 is configured such that an imaging signal which is stored in the memory 1308 is output to the television monitor 1430 or the personal computer 1440 by a predetermined operation. The angular velocity sensor 100 which includes a function in which an angle at the time of rotating the digital still camera 1300 is detected is embedded in the digital still camera 1300.

In addition to the personal computer 1100 (mobile type personal computer) of FIG. 12, the mobile phone 1200 of FIG. 13, and the digital still camera 1300 of FIG. 14, the angular velocity sensor 100 according to an embodiment of the invention can also be applied to an electronic apparatus, such as a mobile terminal such as a smart phone, a communication apparatus, an ink jet type ejecting device (for example, ink jet printer), a laptop type personal computer, a tablet type personal computer, a storage area network apparatus such as a router or a switch, a local area network apparatus, an apparatus for a mobile terminal base station, a television, a video camera, a video recorder, a car navigation device, a real time clock device, a pager, an electronic notebook (including a communication function), an electronic dictionary, an electronic calculator, an electronic game machine, a word processor, a workstation, a videophone, a security television monitor, electronic binoculars, a POS terminal, a medical apparatus (for example, an electronic thermometer, a blood pressure monitor, a blood glucose meter, an electrocardiogram measuring device, an ultrasonic diagnostic device, an electronic endoscope), a fish finder, various measuring instruments, gauges (for example, gauges of a vehicle, an airplane, and a ship), a flight simulator, a head-mounted display, a motion trace, motion tracking, a motion controller, or a pedestrian position orientation measurement (PDR).

Mobile Object

Next, a mobile object which includes a functional element according to an embodiment of the invention will be described using FIG. 15. In the present description, an example in which the angular velocity sensor 100 that is used as a functional element is used will be described.

Figure 15:
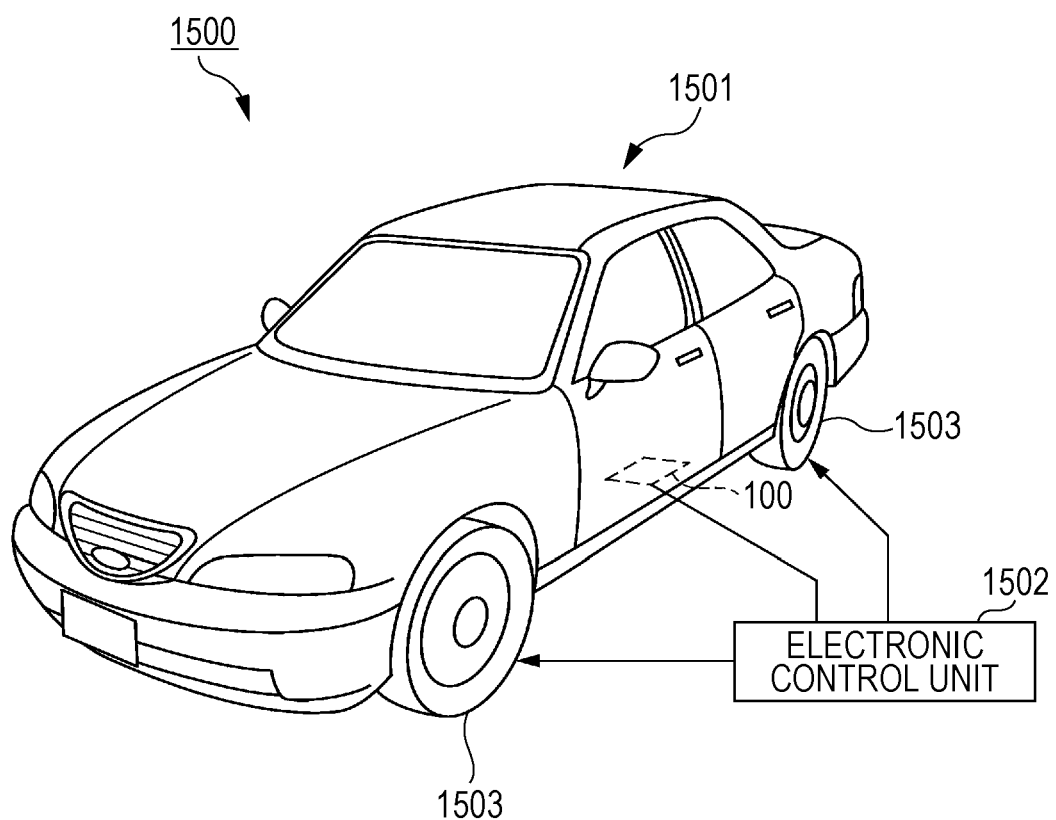
FIG. 15 is a perspective diagram illustrating a schematic configuration of an automobile as an example of an electronic apparatus.

FIG. 15 is a perspective diagram schematically illustrating an automobile 1500 as an example of a mobile object.

The angular velocity sensor 100 according to an embodiment of the invention is mounted in the automobile 1500.

As illustrated in FIG. 15, the angular velocity sensor 100 is embedded in the automobile 1500 which is used as a mobile object, and thereby an electronic control unit 1502 which controls a tire 1503 or the like is mounted in a car body 1501. In addition, in addition to those described above, the angular velocity sensor 100, can be widely applied to an electronic control unit (ECU), such as a keyless entry, an immobilizer, a car navigation system, a car air conditioner, an anti-lock brake system (ABS), an airbag, a tire pressure monitoring system (TPMS), an engine control, a brake system, a battery monitor of a hybrid automobile or an electric vehicle, or a vehicle body posture control system.

The entire disclosure of Japanese Patent Application No. 2014-121216, filed Jun. 12, 2014 is expressly incorporated by reference herein.

What is claimed is:

1. A functional element comprising:
   a first base body;
   a coupling section which is coupled to the first base body;
   a support body which extends from the coupling section;
   a mass body which is coupled to the support body;
   a drive electrode which is provided on a surface side that faces the mass body of the first base body;
   a detection working electrode which extends from the support body; and
   a detection fixed electrode which is coupled to the first base body and faces at least a portion of the detection working electrode,
   wherein the mass body can be displaced in a direction which intersects a main surface of the mass body, and
   wherein, when a distance between the first base body and the mass body is referred to as d1 and a distance between the first base body and the detection fixed electrode is referred to as d2, a relation of d1>d2 is satisfied.

2. The functional element according to claim 1, wherein a thick body section is provided in the first base body, the coupling section is provided in the thick body section, and in a planar view, the mass body and the thick body section are separated from each other.

3. The functional element according to claim 2, wherein at least a portion of the detection fixed electrode is provided in the thick body section.

4. The functional element according to claim 3, wherein a thickness of the detection working electrode is thicker than that of the mass body.

5. The functional element according to claim 3, wherein, when the mass body is vibrated by an AC voltage which is applied between the mass body and the drive electrode, and an angular velocity of axis rotation in a direction along the main surface of the mass body and the direction in which the detection working electrode extends is applied to the mass body, the detection working electrode vibrates in a direction which intersects the direction of the angular velocity.

6. The functional element according to claim 5,
   wherein the support body includes a first elasticity section which is coupled to the coupling section, and a second elasticity section which is coupled to the mass body, and
   wherein a thickness of the first elasticity section is thicker than a thickness of the second elasticity section, in a sectional view.

7. The functional element according to claim 3,
   wherein the support body includes a first elasticity section which is coupled to the coupling section, and a second elasticity section which is coupled to the mass body, and
   wherein a thickness of the first elasticity section is thicker than a thickness of the second elasticity section, in a sectional view.

8. The functional element according to claim 2, wherein a thickness of the detection working electrode is thicker than that of the mass body.

9. The functional element according to claim 2, wherein, when the mass body is vibrated by an AC voltage which is applied between the mass body and the drive electrode, and an angular velocity of axis rotation in a direction along the main surface of the mass body and the direction in which the detection working electrode extends is applied to the mass body, the detection working electrode vibrates in a direction which intersects the direction of the angular velocity.

10. The functional element according to claim 2,
wherein the support body includes a first elasticity section which is coupled to the coupling section, and a second elasticity section which is coupled to the mass body, and
wherein a thickness of the first elasticity section is thicker than a thickness of the second elasticity section, in a sectional view.

11. The functional element according to claim 1, wherein a thickness of the detection working electrode is thicker than that of the mass body.

12. The functional element according to claim 11, wherein, when the mass body is vibrated by an AC voltage which is applied between the mass body and the drive electrode, and an angular velocity of axis rotation in a direction along the main surface of the mass body and the direction in which the detection working electrode extends is applied to the mass body, the detection working electrode vibrates in a direction which intersects the direction of the angular velocity.

13. The functional element according to claim 11,
wherein the support body includes a first elasticity section which is coupled to the coupling section, and a second elasticity section which is coupled to the mass body, and
wherein a thickness of the first elasticity section is thicker than a thickness of the second elasticity section, in a sectional view.

14. The functional element according to claim 1, wherein, when the mass body is vibrated by an AC voltage which is applied between the mass body and the drive electrode, and an angular velocity of axis rotation in a direction along the main surface of the mass body and the direction in which the detection working electrode extends is applied to the mass body, the detection working electrode vibrates in a direction which intersects the direction of the angular velocity.

15. The functional element according to claim 14,
wherein the support body includes a first elasticity section which is coupled to the coupling section, and a second elasticity section which is coupled to the mass body, and
wherein a thickness of the first elasticity section is thicker than a thickness of the second elasticity section, in a sectional view.

16. The functional element according to claim 1,
wherein the support body includes a first elasticity section which is coupled to the coupling section, and a second elasticity section which is coupled to the mass body, and
wherein a thickness of the first elasticity section is thicker than a thickness of the second elasticity section, in a sectional view.

17. An electronic apparatus comprising:
the functional element according to claim 1.

18. A mobile object comprising:
the functional element according to claim 1.

* * * * *